United States Patent
Yang et al.

(10) Patent No.: US 8,885,768 B2
(45) Date of Patent: Nov. 11, 2014

(54) LOW-LOSS, BROAD BAND, LC I/Q PHASE SHIFTER

(75) Inventors: Shoujun Yang, Linz (AT); Johann Peter Forstner, Steinhoering (DE); Guenter Haider, Linz (DE)

(73) Assignee: Infineon Technologies AG, Neubiberg (DE)

( * ) Notice: Subject to any disclaimer, the term of this patent is extended or adjusted under 35 U.S.C. 154(b) by 526 days.

(21) Appl. No.: 13/234,312

(22) Filed: Sep. 16, 2011

(65) Prior Publication Data

US 2013/0070868 A1 Mar. 21, 2013

(51) Int. Cl.
*H04L 27/20* (2006.01)
(52) U.S. Cl.
USPC .......................................... 375/308; 332/105
(58) Field of Classification Search
CPC H03D 3/007; H03L 2207/06; H03L 2207/10; H03L 2207/12; H04B 1/0032; H04B 1/0039; H04L 27/2053; H04L 27/2057; H04L 27/206; H04L 27/2067; H04L 27/2071
USPC ......... 375/279, 280, 281, 283, 295, 297, 298, 375/308; 332/103, 105, 144, 145, 146; 455/91, 113, 114.3, 127.1, 127.2
See application file for complete search history.

(56) References Cited

U.S. PATENT DOCUMENTS

| | | | |
|---|---|---|---|
| 2007/0030922 A1* | 2/2007 | Kato | 375/308 |
| 2008/0139159 A1* | 6/2008 | Ojo et al. | 455/313 |
| 2008/0139162 A1* | 6/2008 | Hafizi | 455/325 |
| 2009/0091491 A1 | 4/2009 | Ujita | |
| 2009/0315792 A1* | 12/2009 | Miyashita et al. | 343/742 |

OTHER PUBLICATIONS

Ming-Da Tsai; Natarajan, A.: 60GHz passive and active RF-path phase shiftersin silicon. In : Radio Frequency Integrated Circuits Symposium, 2009. RFIC 2009, Jun. 7-9, 2009, 223-226.

* cited by examiner

*Primary Examiner* — Young T. Tse
(74) *Attorney, Agent, or Firm* — Eschweiler & Associates, LLC

(57) ABSTRACT

Some embodiments relate to a phase shifter that includes an I/Q phase shifter and at least one LC balun. Compared to conventional phase shifters, phase shifter has primarily only LC components, thereby limiting losses relative to conventional solutions. In one embodiment, for example, a phase shifter shows a large bandwidth at 77 GHz center frequency (e.g., 1 dB amplitude error bandwidth is approximately 40 GHz; 1° phase error bandwidth is about 16.5 GHz). The inductors included in phase shifter, in contrast to the quarter wave transmission lines used in conventional phase shifters, reduces chip area compared with conventional solutions. In some embodiments, an emitter follower helps to provide a relatively constant output that is largely independent of temperature, input power, VCC, manufacturing variation, and so on.

19 Claims, 4 Drawing Sheets

LOW-LOSS, BROAD BAND, LC I/Q PHASE SHIFTER

BACKGROUND

Quadrature amplitude modulation (QAM) can be used as an analog or digital modulation scheme, and is used extensively in many telecommunication systems. QAM conveys two analog message signals or two digital bit streams by changing (modulating) the amplitudes of two carrier waves, where in the carrier waves are 90° out of phase with each other and are usually sinusoids. After the two carrier waves are modulated, the resulting modulated waveforms (which are often referred to as an "I-channel" and "Q-channel") are added together (summed). In the digital case, this summed waveform is a combination of both phase-shift keying (PSK) and amplitude-shift keying (ASK); while, in the analog case, the summed waveform is a combination of phase modulation (PM) and amplitude modulation (AM).

Regardless of whether a digital bit stream or analog message is to be conveyed, QAM transmitters and receivers include I/Q phase shifters to help generate the 90° phase shift for their I and Q channels. As the inventors have appreciated, conventional I/Q phase shifters are less than ideal for several reasons. For example, the loading impedance of an I/Q phase shifter (e.g., made up of a Gilbert cell) is dependent on temperature, input power, manufacturing process variations, frequency, and so on, such that the performance of the I/Q phase shifter can vary widely, leading to phase shifts that "wander" from 90° over time. Therefore, the inventors have devised improved low-loss, broad band, LC I/Q phase shifters as described further herein.

DETAILED DESCRIPTION

Figure 1:
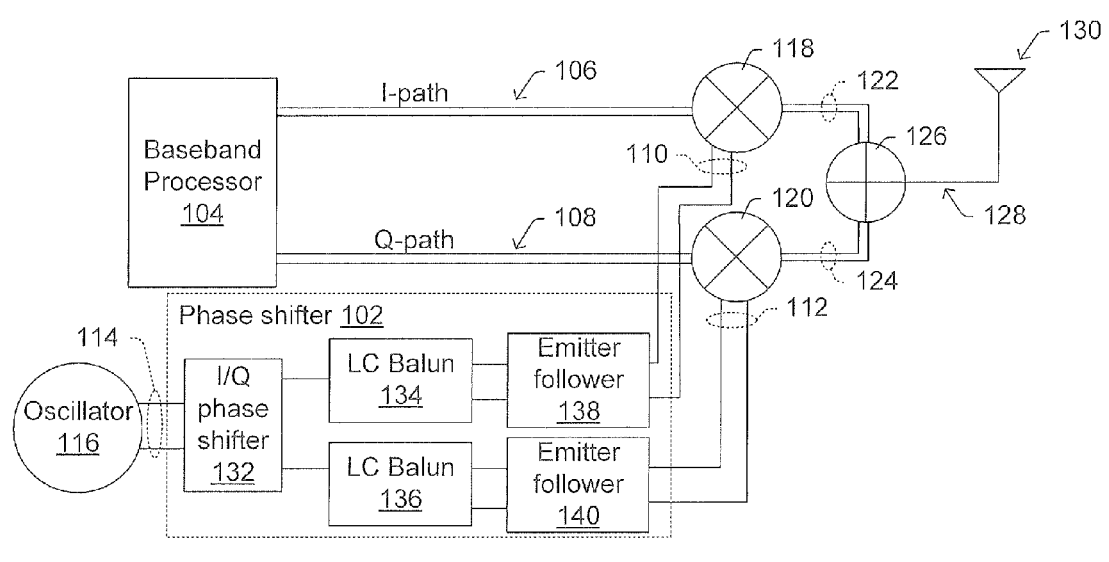
FIG. 1 is a block diagram of a QAM transmitter that makes use of differential signals in accordance with some embodiments.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details.

To provide one example context where phase shift elements may be used, FIG. 1 shows a QAM transmitter 100 that includes a phase shifter 102 in accordance with some embodiments. As the inventors have appreciated, the phase shifters disclosed herein are well suited for QAM transmitters and QAM receivers. In particular, compared to some conventional phase shifters, the phase shifters disclosed herein can provide relatively constant phase shifts over a wide variety of frequencies and temperatures. Although FIG. 1's phase shifter 102 is illustrated in the context of a QAM transmitter 100, however, it will be appreciated that the phase shifters disclosed herein are not limited to QAM transmitters or receivers, but are applicable to any circuit or application where a phase shift of approximately 90° is used.

More particularly, one can see FIG. 1's QAM transmitter 100 includes a baseband processor 104, which provides I-data signals and Q-data signals over an I-data path 106 and a Q-data path 108, respectively. To facilitate a phase shift of approximately 90° between the I-data and Q-data signals, the phase shifter 102 provides first and second differential local oscillator (LO) signals (110, 112, respectively), which are 90° phase shifted with respect to one another.

A first mixer 118 mixes the I-signal on 106 with the first differential LO signal 110, thereby providing an up-converted I-data signal 122. Similarly, a second mixer 120 mixes the Q-signal on 108 with the second differential LO signal 112, thereby providing an up-converted Q-data signal 124. A summation element 126 then sums the I-data signal 122 and Q-data signal 124, and can deliver the resulting summed modulation signal 128 to an RF antenna element 130. Although FIG. 1 discusses the phase shifter 102 in the context of a transmitter, it will be appreciated that phase shifters in accordance with this disclosure are equally applicable to receivers (e.g., as would be the case if the propagation direction of the signals were reversed on the I-data and Q-data paths of FIG. 1).

The phase shifter 102 of FIG. 1 includes an I/Q phase shifter 132, first and second LC baluns (134, 136), first and second emitter followers 138/140, which are operably coupled as shown. If CMOS technology were used, two source followers could be used in place of the first and second emitter followers 138/140. During operation, the phase shifter 102 receives a differential oscillation signal 114 having oscillation frequency $f_{osc}$, and provides first and second differential LO signals 110, 112 at its output terminals, wherein the differential LO signals are 90° phase shifted with respect to one another. Often, the first LO signal 110 is phase shifted (e.g., by +45°) with respect to the oscillation signal 114, and the second LO signal 112 is phase shifted by a different amount (e.g., −45°) with respect to the oscillation signal 114, thereby giving the desired 90° phase shift.

Figure 2:
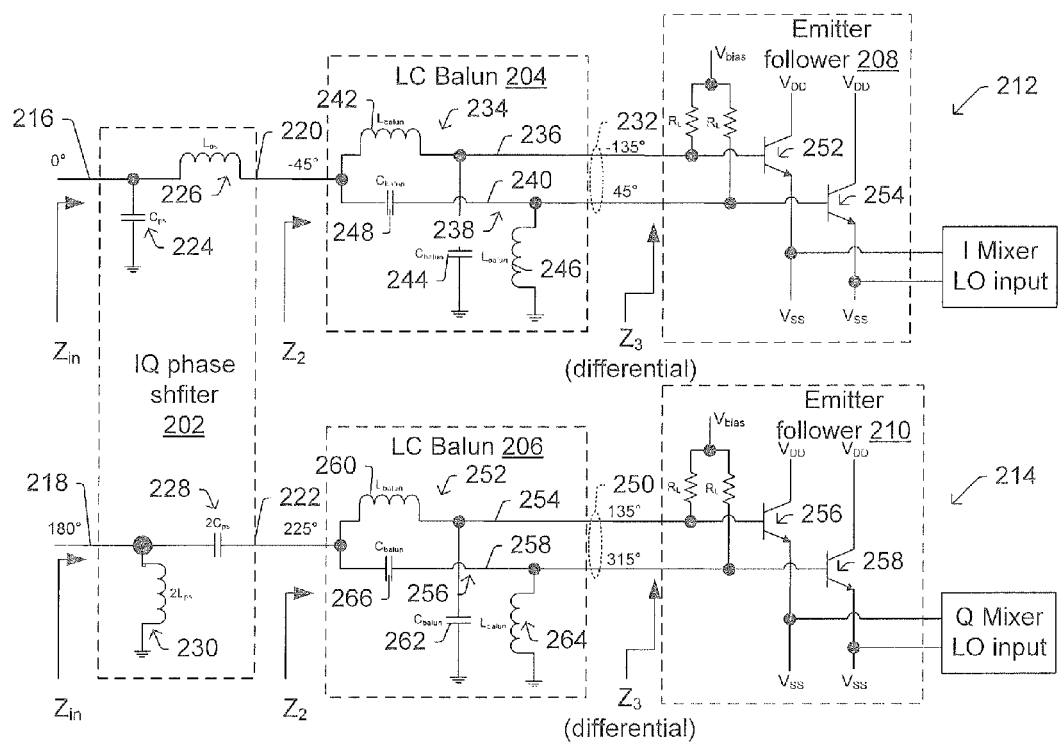
FIG. 2 is a circuit diagram of a differential phase shifter in accordance with some embodiments.

Turning now to FIG. 2, one can see a more detailed depiction of a phase shifter 200 in accordance with some embodiments. Like FIG. 1's previously discussed embodiment, the phase shifter 200 includes an I/Q phase shifter 202, first and second LC baluns (204, 206), first and second emitter followers (208, 210), which are operably coupled on an I-path 212 and a Q-path 214 as shown. Compared to conventional phase shifters, phase shifter 200 has only LC components except for resistors $R_L$, so that the phase shifter 200 provides small losses which are set by the quality factors of L and C. In one embodiment, the phase shifter 200 shows a large bandwidth at 77 GHz center frequency (e.g., 1 dB amplitude error bandwidth is approximately 40 GHz; 1° phase error bandwidth is about 16.5 GHz). The inductors included in phase shifter 200, in contrast to the quarter wave transmission lines used in conventional phase shifters, reduces chip area compared with conventional solutions. Further, the emitter follower 208/210 helps to provide a relatively constant input impedance that is largely independent of temperature, input power, VCC, manufacturing variation, and so on. For these reasons, among others, FIG. 2's phase shifter can be an improvement over conventional solutions.

As seen in FIG. 2, the IQ phase shifter 202 includes phase shifter input terminals 216, 218, and IQ phase shifter output terminals 220, 222. The IQ phase shifter 202 includes a first capacitor 224 and a first inductor 226 coupled to the I-LO path 212, and a second capacitor 228 and a second inductor 230 coupled to the Q-LO path 214, which are operably coupled as shown. The second capacitor 228 often has a capacitance that is approximately twice that of the first capacitor 224. Similarly, the second inductor 230 often has an inductance that is approximately twice that of the first inductor 226.

During operation, the IQ phase shifter 202 receives a differential signal on terminals 216, 218, wherein the differential signal has a 180° phase shift between its two signal components (e.g., 0° and 180°, respectively). The IQ phase shifter 202 then inserts a −45° phase offset on the I-LO path 212 (e.g., from 0° on 216 to −45° at 220); and concurrently inserts a +45° phase offset on the Q-LO path 214 (e.g., from 180° on 218 to 225° on 222). Thus, the IQ phase shifter 202 effectively inserts a 90° phase shift (or 270° phase shift, depending on the reference point) into the original differential signal.

The first LC balun 204 receives the single ended signal from 220, and converts the single-ended signal into an I-LO differential signal 232. To facilitate this functionality, the first LC balun 204 includes a first LC element 234 coupled to a first signal path 236, and a second LC element 238 coupled to a second signal path 240. The first LC element 234 includes a first inductor 242 and a first capacitor 244; while the second LC element 238 includes a second inductor 246 and a second capacitor 248.

The second LC balun 206 receives the single ended signal from 222 and converts the single-ended signal into a Q-LO differential signal 250. To facilitate this functionality, the second LC balun 206 includes a third LC element 252 coupled to a third signal path 254, and a fourth LC element 256 coupled to a fourth signal path 258. The third LC element 252 includes a third inductor 260 and a third capacitor 262; while the fourth LC element 256 includes a fourth inductor 264 and a fourth capacitor 266.

The first, second, third and fourth inductors (242, 246, 260, 264) often have the same inductance value, and the first, second, third and fourth capacitors (244, 248, 262, 266) often have the same capacitance values.

As one of ordinary skill in the art appreciates, baluns can take many different forms but are often used to connect lines of differing impedance (e.g., to connect impedance Z2 with impedance Z3 in FIG. 2). In general, a balun is a device that can convert an electrical signal that is unbalanced (e.g., a single ended signal) to an electrical signal that is balanced about ground (e.g., a differential signal), or vice versa. In addition to converting a single-ended signal to a differential signal, the first and second baluns 204, 206 can also induce a phase-shift, for example a −90° phase shift, between their input and output terminals.

The first emitter follower 208 includes control terminals on which the I-LO differential signal 232 is received. This I-LO differential signal 232, in conjunction with a bias voltage established by resistors $R_L$, drives control terminals of a pair of transistors 252, 254. This I-LO signal on 232 is coupled to I-mixer LO input 212 by these transistors configured as common collector amplifier (emitter follower).

The second emitter follower 210 similarly includes control terminals on which the Q-LO differential signal 250 is received. This Q-LO differential signal 250, in conjunction with a bias voltage established by resistors $R_L$, drives control terminals of a pair of transistors 256, 258. This Q-LO signal on 250 is coupled to Q-mixer LO input by these transistors configured as common collector amplifier (emitter follower).

Figure 3:
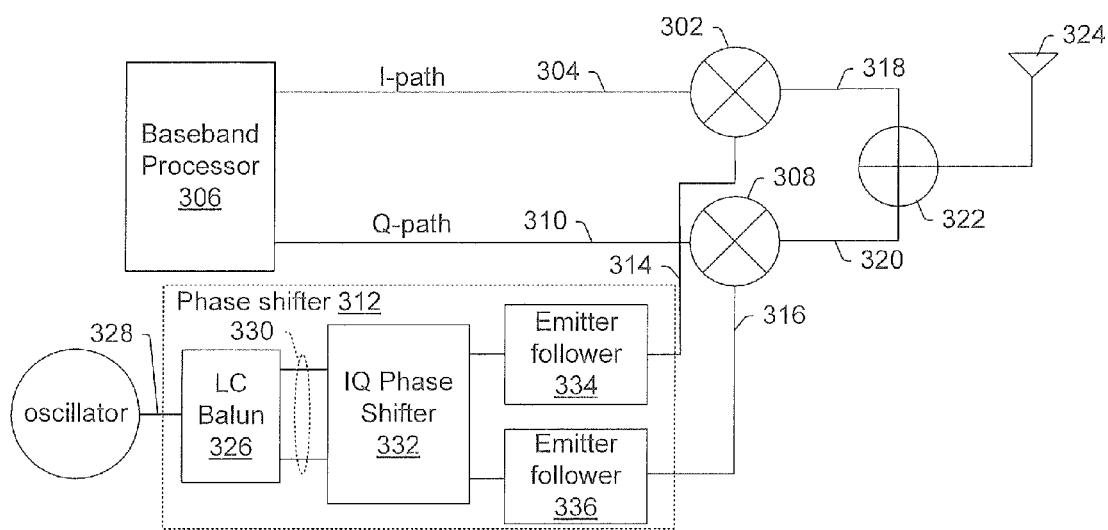
FIG. 3 is a block diagram of a QAM transmitter that makes use of single-ended signals in accordance with some embodiments.

FIG. 3 shows another embodiment of a QAM transmitter 300. In comparison to FIG. 1's QAM transmitter, which operated on differential signals, FIG. 3's QAM transmitter uses single-ended signals. Thus, a first mixer 302 receives a single-ended I-data signal 304 from baseband processor 306; and a second mixer 308 receives a single-ended Q-data signal 310 from baseband processor 306. A phase shifter 312 provides first and second single-ended LO signals (314, 316, respectively) to the first and second mixers (302, 308, respectively), wherein the single ended LO signals 314, 316 are approximately 90° out of phase with one another. The first mixer 302 thereafter outputs a single-ended, up-converted I-data signal 318. Similarly, the second mixer 308 outputs a single-ended, up-converted Q-data signal 320. A summation element 322 then sums the two signals, after which an RF antenna unit 324 transmits the resultant signal.

Because of the single-ended configuration used in FIG. 3, the phase shifter 312 in FIG. 3 is slightly different from that of FIG. 1. FIG. 3's phase shifter 312 includes an LC balun 326 having an input 328 and a differential output 330. An IQ phase shifter 332 has respective inputs coupled to the differential output of the LC balun 326 and also include two output terminals. A first emitter follower 334 is coupled to one of the output terminals of the IQ phase shifter, and a second emitter follower 336 is coupled to the other output terminals of the IQ phase shifter.

Figure 4:
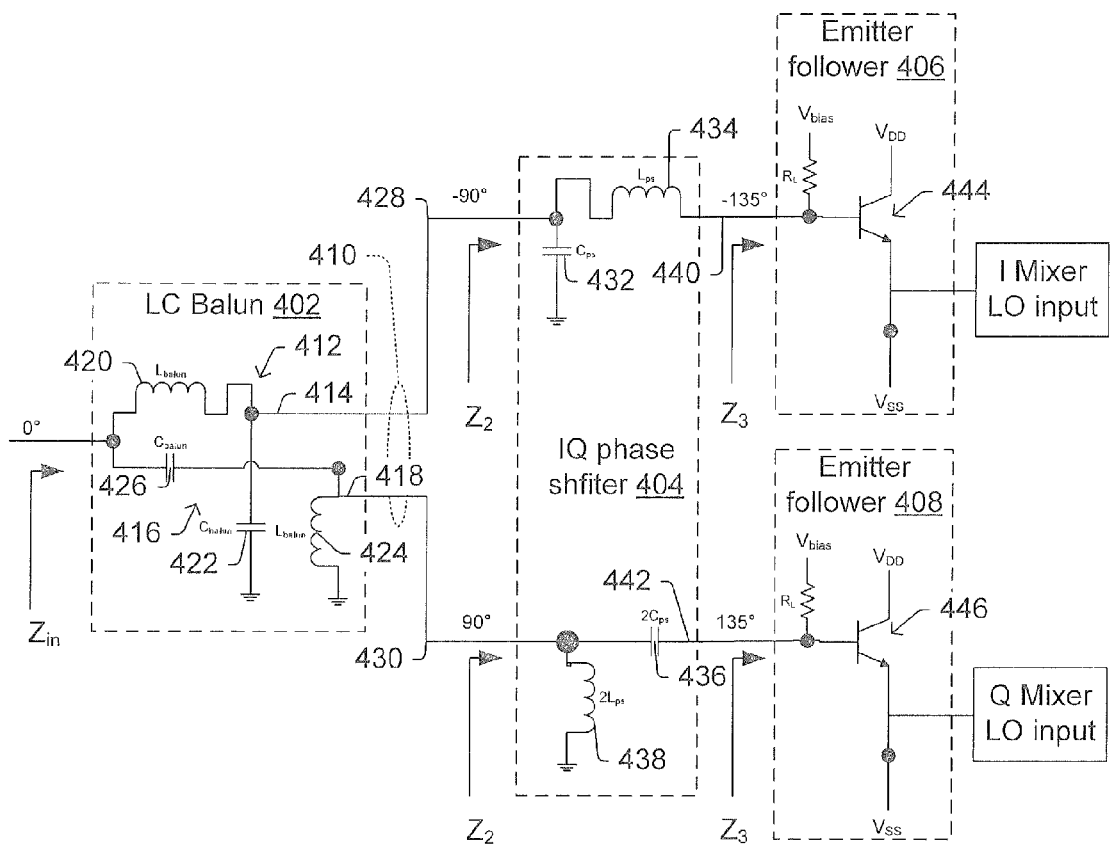
FIG. 4 is a circuit diagram of a single-ended phase shifter in accordance with some embodiments.

FIG. 4 shows a more detailed embodiment of a phase shifter 400 which makes use of single-ended signals. The phase shifter includes an LC balun 402, an IQ phase shifter 404, and emitter followers 406/408, which are operably coupled as shown. Like FIG. 2's embodiment, compared to conventional phase shifters, phase shifter 400 has only LC components except for resistors $R_L$. Because of this, the phase shifter 400 provides small losses which are set by the quality factors of L and C. The inductors included in phase shifter 400, in contrast to the quarter wave transmission lines used in conventional phase shifters, also reduce chip area compared with conventional solutions. Further, the emitter follower 406/408 helps to provide a relatively constant input impedance that is largely independent of temperature, input power, VCC, manufacturing variation, and so on. For these reasons, among others, FIG. 4's phase shifter can be an improvement over conventional solutions.

The LC balun 402 receives a single ended oscillation signal and converts the single-ended oscillation signal into a differential signal 410, which has its components separated by a phase shift of approximately 180°. To facilitate this functionality, the LC balun 402 includes a first LC element 412 coupled to a first signal path 414, and a second LC element 416 coupled to a second signal path 418. The first LC element 412 includes a first inductor 420 and a first capacitor 422; while the second LC element 416 includes a second inductor 424 and a second capacitor 426.

The IQ phase shifter 404 includes phase shifter input terminals 428, 430, which are coupled to the output of the LC balun 402. The IQ phase shifter 404 includes a first capacitor 432 and a first inductor 434 coupled to the I-LO path, and a second capacitor 436 and a second inductor 438 coupled to the Q-LO path. The second capacitor 436 often has a capacitance that is approximately twice that of the first capacitor 432. Similarly, the second inductor 438 often has an inductance that is approximately twice that of the first inductor 434.

During operation, the IQ phase shifter 404 receives a differential signal on terminals 428, 430, wherein the differential signal has a 180° phase shift between its two signal components (e.g., 0° and 180°, respectively). The IQ phase shifter 404 then inserts a −45° phase offset on the I-LO path (e.g., from −90° on 428 to −135° at 440); and concurrently inserts a +45° phase offset on the Q-LO path (e.g., from 90° on 430 to 135° on 442). Thus, the IQ phase shifter 404 effectively inserts a 90° phase shift (or 270° phase shift, depending on the reference point) into the original differential signal.

The first emitter follower 406 includes a resistor $R_L$ coupled to a supply voltage to establish a bias voltage on the I-LO path. An output transistor 444 configured as common collector amplifier (emitter follower) follows the input signal 440 to output node to provide a single ended LO signal to the I mixer LO input. The second emitter follower 408 includes a resistor $R_L$ coupled to the supply voltage to establish a bias voltage on the Q-LO path. Output transistor 446 also configured as common collector amplifier (emitter follower) follows the input signal 436 to output node to provide a single ended LO signal to the Q-mixer LO input.

Although the disclosure has been shown and described with respect to one or more implementations, equivalent alterations and modifications will occur to others skilled in the art based upon a reading and understanding of this specification and the annexed drawings. For example, although some of the figures show p-type devices (and n-type devices), it will be appreciated that the polarity of these devices can be "flipped" in other embodiments when the corresponding biases are reversed.

Further, it will be appreciated that identifiers such as "first" and "second" do not imply any type of ordering or placement with respect to other elements; but rather "first" and "second" and other similar identifiers are just generic identifiers. In addition, it will be appreciated that the term "coupled" includes direct and indirect coupling. The disclosure includes all such modifications and alterations and is limited only by the scope of the following claims. In particular regard to the various functions performed by the above described components (e.g., elements and/or resources), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. In addition, the articles "a" and "an" as used in this application and the appended claims are to be construed to mean "one or more".

Furthermore, to the extent that the terms "includes", "having", "has", "with", or variants thereof are used in either the detailed description or the claims, such terms are intended to be inclusive in a manner similar to the term "comprising."

What is claimed is:

1. A phase shifter, comprising:
an I/Q phase shifter including an I-LO path having a single-ended I-LO output and a Q-LO path having a single-ended Q-LO output;
a first LC balun having a single-ended input coupled to the single-ended I-LO output and having differential output terminals;
a first emitter follower having first and second control terminals coupled to the respective differential output terminals of the first LC balun;
a second LC balun having a single-ended input coupled to the single-ended Q-LO output and having differential output terminals; and
a second emitter follower having first and second control terminals coupled to the respective differential output terminals of the second LC balun.

2. The phase shifter of claim 1, wherein the I/Q phase shifter is adapted to receive a differential oscillation signal on I/Q phase input terminals.

3. The phase shifter of claim 2:
wherein the I-LO path of the I/Q phase shifter induces a phase shift of approximately −45° between a first input terminal of the I/Q phase shifter and the single-ended I-LO output; and
wherein the Q-LO path of the I/Q phase shifter induces a phase shift of approximately +45° between a second input terminal of the I/Q phase shifter and the single-ended Q-LO output.

4. The phase shifter of claim 1:
wherein incoming signals on the I-LO path and the Q-LO path are approximately 180° phase shifted with respect to one another; and
wherein a first outgoing signal provided by the first LC balun on the I-LO path is approximately 270° phase shifted with respect to a second outgoing signal provided by the second LC balun on the Q-LO path.

5. The phase shifter of claim 1, wherein the first LC balun comprises:
a first signal path stemming from the I-LO path and coupled to a first of the differential output terminal of the first LC balun;
a second signal path stemming from the I-LO path and coupled to a second of the differential output terminals of the first LC balun.

6. The phase shifter of claim 5, where the first LC balun further comprises:
a first LC element coupled to the first signal path; and
a second LC element coupled to the second signal path.

7. The phase shifter of claim 6:
wherein the first LC element is adapted to phase shift a signal received from the single-ended I-LO output by approximately −90° and thereby output a first phase-shifted signal to the first differential output terminal of the first LC balun; and
wherein the second LC element is adapted to phase shift a signal received from the single-ended Q-LO output by approximately +90° and thereby output a second phase-shifted signal to the second differential output terminal of the first LC balun.

8. A phase shifter, comprising:
a LC balun having a single-ended input terminal and differential output terminals;
an I/Q phase shifter having an I-LO path and a Q-LO path, wherein the I-LO path has an input terminal coupled to a first differential output terminal of the LC balun and wherein the Q-LO path has an input terminal coupled to a second differential output terminal of the LC balun;
a first emitter follower having a control terminal coupled to an output terminal of the I-LO path of the I/Q phase shifter; and
a second emitter follower having a control terminal coupled to an output terminal of the Q-LO path of the I/Q phase shifter.

9. The phase shifter of claim 8, further comprising:
an oscillation element adapted to provide a single-ended oscillation signal having an oscillation frequency to the single-ended input terminal of the LC balun.

10. The phase shifter of claim 8:
wherein the I/Q phase shifter is adapted to induce an approximately −45° phase shift on the I-LO path; and wherein the I/Q phase shifter is adapted to induce an approximately +45° phase shift to on the Q-LO path.

11. The phase shifter of claim 8:
wherein incoming signals on the I-LO path and the Q-LO path are approximately 180° phase shifted with respect to one another; and
wherein outgoing signals on the I-LO path and the Q-LO path are approximately 270° phase shifted with respect to one another.

12. The phase shifter of claim 8, wherein the LC balun comprises:
a first signal path stemming from the single-ended input terminal and coupled to a first terminal of the differential output terminals of the LC balun;
a second signal path stemming from the single-ended input terminal and coupled to a second terminal of the differential output terminals of the LC balun.

13. The phase shifter of claim 12, where the LC balun further comprises:
a first LC element coupled to the first signal path; and
a second LC element coupled to the second signal path.

14. The phase shifter of claim 13:
wherein the first LC element is adapted to phase shift a signal received from the single-ended input terminal by approximately −90° and thereby output a first phase-shifted signal to the input terminal of the I-LO path; and
wherein the second LC element is adapted to phase shift a signal received from the single-ended input terminal by approximately +90° and thereby output a second phase-shifted signal to the input terminal of the Q-LO path.

15. A communication device, comprising:
an oscillation element having single-ended output on which an oscillation signal having an oscillation frequency is provided;
a LC balun having a single-ended input terminal and differential output terminals, wherein the single-ended input terminal is coupled to the single ended output of the oscillation element;
an I/Q phase shifter having an I-LO path and a Q-LO path, wherein the I-LO path has an input terminal coupled to a first differential output terminal of the LC balun and wherein the Q-LO path has an input terminal coupled to a second differential output terminals of the LC balun;
a first mixer having an I-data input and an I-LO input, wherein the I-LO input is coupled to an I-LO output terminal of the I/Q phase shifter; and
a second mixer having a Q-data input and a Q-LO input, wherein the Q-LO input is coupled to an Q-LO output terminal of the I/Q phase shifter.

16. The communication device of claim 15, further comprising:
a first emitter follower coupled between the I-LO output terminal of the I/Q phase shifter and the I-LO input of the first mixer; and
a second emitter follower coupled between the Q-LO output terminal of the I/Q phase shifter and the Q-LO input of the second mixer.

17. The communication device of claim 15, wherein the communication device acts as a transmitter and the I-data input and the Q-data input are coupled to a baseband processor and receive baseband signals there from.

18. A communication device, comprising:
an oscillation element having differential output on which an oscillation signal having an oscillation frequency is provided;
an I/Q phase shifter having an single-ended I-LO path coupled to a first terminal of the differential output of the oscillation element and having a single-ended Q-LO path coupled to a second terminal of the differential output of the oscillation element;
a first LC balun having a single-ended input coupled to the single-ended I-LO path and having differential output terminals;
a second LC balun having a single-ended input coupled to the single-ended Q-LO path and having differential output terminals;
a first mixer having an I-data input and a differential I-LO input, wherein the differential I-LO input is coupled to the differential output terminals of the first LC balun; and
a second mixer having a Q-data input and a differential Q-LO input, wherein the differential Q-LO input is coupled to the differential output terminals of the second LC balun.

19. The communication device of claim 18, further comprising:
a first emitter follower coupled between one of the differential output terminals of the first LC balun and the differential I-LO input of the first mixer; and
a second emitter follower coupled between one of the differential output terminals of the second LC balun and the differential Q-LO input of the second mixer.

* * * * *